United States Patent
Min et al.

(10) Patent No.: US 9,429,320 B2
(45) Date of Patent: Aug. 30, 2016

(54) GAS-AIR MIXING DEVICE FOR COMBUSTOR

(71) Applicant: KYUNGDONG NAVIEN CO., LTD., Pyeongtaek-si, Gyeonggi-do (KR)

(72) Inventors: Myoung Gee Min, Seoul (KR); Duk Byung Lim, Suwon-si (KR)

(73) Assignee: KYUNGDONG NAVIEN CO., LTD., Pyeongtaek-si, Gyeonggi-do (KR)

( * ) Notice: Subject to any disclaimer, the term of this patent is extended or adjusted under 35 U.S.C. 154(b) by 44 days.

(21) Appl. No.: 14/377,171

(22) PCT Filed: Jan. 17, 2013

(86) PCT No.: PCT/KR2013/000380
§ 371 (c)(1),
(2) Date: Aug. 6, 2014

(87) PCT Pub. No.: WO2013/118983
PCT Pub. Date: Aug. 15, 2013

(65) Prior Publication Data
US 2015/0000775 A1 Jan. 1, 2015

(30) Foreign Application Priority Data
Feb. 6, 2012 (KR) ........................ 10-2012-0011650

(51) Int. Cl.
| | |
|---|---|
| F16K 11/07 | (2006.01) |
| F23N 1/02 | (2006.01) |
| F23D 14/62 | (2006.01) |
| F16K 11/04 | (2006.01) |
| F16K 31/02 | (2006.01) |

(52) U.S. Cl.
CPC ............. *F23N 1/022* (2013.01); *F16K 11/04* (2013.01); *F16K 31/02* (2013.01); *F23D 14/62* (2013.01); *F23N 1/027* (2013.01); *F23N 2035/06* (2013.01); *F23N 2035/24* (2013.01); *F23N 2037/10* (2013.01); *Y10T 137/86815* (2015.04)

(58) Field of Classification Search
CPC .............. F23N 1/027; F23N 2035/06; F23N 2037/10; F23N 2035/24; F23N 1/022; F23D 14/62; F16K 31/02; F16K 11/04
USPC .................................... 137/602, 605, 625.48
See application file for complete search history.

(56) References Cited

U.S. PATENT DOCUMENTS 3,459,220 A * 8/1969 Morse ..................... F16K 1/305
137/210
2011/0139045 A1 6/2011 Zatti et al.

FOREIGN PATENT DOCUMENTS

| JP | 2001-272029 A | 10/2001 |
|---|---|---|
| JP | 2001-289437 A | 10/2001 |

(Continued)

*Primary Examiner* — Marina Tietjen
*Assistant Examiner* — Umashankar Venkatesan
(74) *Attorney, Agent, or Firm* — Novick, Kim & Lee, PLLC; Jae Youn Kim

(57) ABSTRACT

Provided is a gas-air mixing device for a combustor which effectively controls the amount of gas and air supplied to a burner provided in a combustor, thus improving the turn-down ratio which leads to increased convenience for using hot water and heat and enhanced durability of the burner. The gas-air mixing device for a combustor comprises: a housing, connected on one side to a turbo fan; a discharge part disposed on one side of the housing and in contact with the turbo fan; first and second air supply parts, provided on the other side of the discharge part and separated by a first partition; first gas supply part, divided by a second partition, and a second gas supply part having a protruding part; and an opening/closing means for controlling the flow of gas and air by opening or closing the second air supply part and the second gas supply part.

6 Claims, 4 Drawing Sheets

(56) References Cited

FOREIGN PATENT DOCUMENTS

| KR | 10-0805630 B1 | 2/2008 |
| KR | 10-0960100 B1 | 5/2010 |
| KR | 10-2010-0069665 A | 6/2010 |
| KR | 10-2012-0109966 A | 10/2012 |

* cited by examiner

US 9,429,320 B2

GAS-AIR MIXING DEVICE FOR COMBUSTOR

TECHNICAL FIELD

The present invention relates to a gas-air mixing device for a combustor, and more specifically to a gas-air mixing device for a combustor which effectively controls the amount of gas and air supplied to a burner provided in a combustor, such as a boiler or a water heater, thus improving the turn-down ratio which leads to increased convenience for using hot water and heat and enhanced durability of the burner.

BACKGROUND OF THE INVENTION

In general, combustors used for hot water and heating, such as a boiler or a water heater, are classified into an oil boiler, a gas boiler, an electric boiler and a water heater depending on the fuel it is supplied with, and are diversely developed to fit different installation usages.

Among these combustors, in particular, the gas boiler and the water heater generally use a Bunsen Burner or a Premixed Burner to combust gas fuel, and among these the combustion method of the premixed burner is carried out by mixing gas and air with mixing ratio of combustion optimum state and supplying this mixture (air+gas) to a burner port for combustion.

The function of a combustor is evaluated by the turn-down ratio (TDR). A turn-down ratio refers to 'a ratio of maximum gas consumption versus minimum gas consumption' in a gas combustion device in which the gas volume is variable regulated. For instance, if the maximum gas consumption is 24,000 kcal/h and the minimum gas consumption is 8,000 kcal/h, the turn-down ratio is 3:1. The turn-down ratio is controlled according to the ability to maintain a stable flame under minimum gas consumption condition.

In the gas boiler and the water heater, convenience of using hot water and heat increases with larger turn-down ratio. That is, if the turn-down ratio is small (meaning the maximum gas consumption is high) and the burner is activated for a small load volume of the heating water and heat, frequent On/Off of the combustor occurs, thereby deviation during temperature control increases and durability of the apparatus decreases. Therefore, various methods have been developed to increase the turn-down ratio applied to a combustor in order to improve aforementioned problems.

Valves which supply gas to these types of burners with proportional control are largely divided into electrical modulating gas valve, which is controlled by current value, and pneumatic modulating gas valve, which is controlled by differential pressure generated during air supply.

In the pneumatic modulating gas valve, the amount of gas supplied to the burner is controlled using a fan by differential pressure generated according to air supply needed for combustion in the burner. At this time, the air and gas needed for combustion are mixed in the gas-air mixer and supplied to the burner as a mixture (air+gas).

In a gas-air mixing device of a gas burner using such pneumatic modulating gas valve, the primary factor controlling the turn-down ration is the relationship between gas consumption (Q) and differential pressure ($\Delta P$). The common relationship between fluid pressure and flow rate is as follows:

$$Q = k\sqrt{\Delta P}$$

As shown in the above formula, differential pressure needs to be quadrupled in order to double fluid flow rate.

Therefore, differential pressure ratio must be 9:1 in order to have a turn-down ratio of 3:1, and the differential pressure ratio needs to be 100:1 to have a turn-down ratio of 10:1. However, it is impossible to infinitely increase the gas feed pressure.

In order to solve the above problem, the present invention describes, as illustrated in FIG. 1, a method for increasing the turn-down ratio of the gas burner by dividing the gas and air supply paths into more than two sections, respectively, and opening/closing each passage of gas injected into the burner.

PRIOR ART

Patent Literature (Patent Literature 1) Korean Patent Application No. 10-2011-84417

The patent literature is a previously filed application by the applicant of the present invention and is directed to a gas-air mixer with a separable passage. Referring to FIG. 1, a gas supply pipe (112) that is divided into two parts is connected to one side of the air supply pipe (113), and a separate branching mechanism (170) is provided inside the air supply pipe (113). As a result, a valve body (161, 162) opens and blocks a gas passage (116) and an air passage (118) via the up and down motion of a rod (163) connected to an electromagnet (165), through which the minimum output mode and the maximum output mode can be controlled, to improve the turn-down ratio.

However, aforementioned up and down motion of the rod (163) in the air passage (118) has a long range, which increase stroke, resulting in increased driving time and driving distance.

Also, since a separate branching mechanism (170) is interposed in the air passage (118), manufacturing is inconvenient and detachment is difficult when the apparatus is broken.

DISCLOSURE OF INVENTION

Technical Problem

The present invention has been made to solve the above-described problem occurring in the prior art, and an object of the present invention is to provide a gas-air mixing device for a combustor having a separate opening/closing means for controlling the amount of air and gas flowing into a burner, such as a boiler or a water heater, through which the amount of air and gas can be controlled to increase the turn-down ratio.

Technical Solution

The present invention, which aims to solve the above-described problem comprises, a housing connected on one side to a turbo fan and is provided with a space of a predetermined size in the interior thereof through which gas and air can flow; a discharge part disposed on one side of the housing and in contact with the turbo fan; first air supply part and a second air supply part, provided on the other side of the discharge part for intake of outside air, and separated by a first partition; a first gas supply part and second gas supply part separated by a second partition, for supplying gas which mixes with air flowing in from the first air supply part and second air supply part and discharged via the discharge part, wherein the second gas supply part is provided with a protruding part protruding a predetermined length at upper portion thereof, and is equal in height to the protruding part; and an opening/closing means for blocking the flow of gas and air by closing the second air supply part and the second gas supply part when in low-output mode, and for opening the second air supply part and the second gas supply part to allow gas and air flow when in a high-output mode.

In one embodiment, the opening/closing means comprises a valve body which blocks gas entry by being in contact with the upper portion of the second gas supply part; a plunger connected to the valve body; and a latch solenoid valve that is connected to the plunger and controls the up and down motion of the plunger to open and close the valve body.

In one embodiment, the plunger and the valve body further comprise a first spring that is provided between the plunger and the valve body and elastically supports the valve body.

In one embodiment, the second air supply part and the second gas supply part are characterized by having identical flow directions of the second air and second gas.

In one embodiment, the valve is characterized by being configured either as a latch solenoid valve or a regular solenoid valve.

Advantageous Effects

Using the gas-air mixing device for a combustor according to the present invention, first, turn-down ratio can be increased to regulate the amount of gas and air required for the combustor at a larger range. Thus, fine heat control is possible during change in flow and also variation range of the hot water temperature can be reduced.

Second, a latch solenoid valve with a simple structure of the driving part and excellent durability is used, and by forming a protruding part and a second gas supply part in contact with a valve body that is connected to the latch solenoid valve, stroke of the latch solenoid valve can be reduced simultaneously with minimizing failure rate of the latch solenoid valve.

Third, the gas and air are configured to flow in through a single body, thereby it is easy to repair damages and manufacturing cost can be minimized.

Fourth, the structure is simplified by having same flow direction of a second air and second gas, thereby reducing time and cost during manufacture and allowing easy maintenance.

DESCRIPTION OF THE PREFERRED EMBODIMENTS

Figure 1:
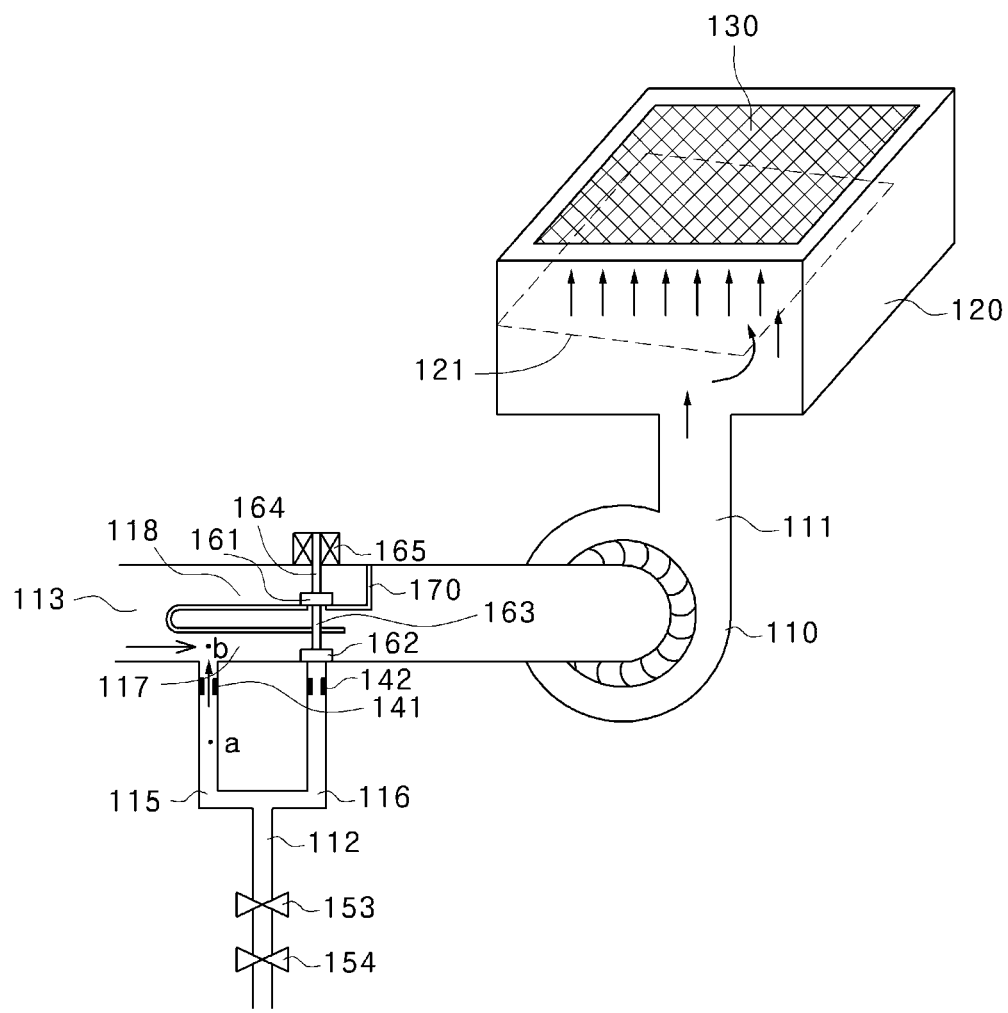
FIG. 1 is a graph showing prior art.

Hereinafter, exemplary embodiment of the present invention will be described with reference to the accompanying drawings. The embodiment of the present invention can be modified into various forms, and it should be understood that the scope of present invention is not limited to the embodiment whose detailed description is provided below. The following embodiment is given to provide a more detailed description of the preset invention to those skilled in the art. Therefore, shapes of the elements may be exaggerated in the drawings for a clearer understanding of the description. Identical or corresponding elements in each drawing may be designated with same reference signs. In addition, description of known functions or configurations determined to hinder understanding of the present invention are omitted.

Hereafter, an exemplary embodiment of the gas-air mixing device for a combustor will be described in detail with reference to the accompanying drawings.

Figure 2:
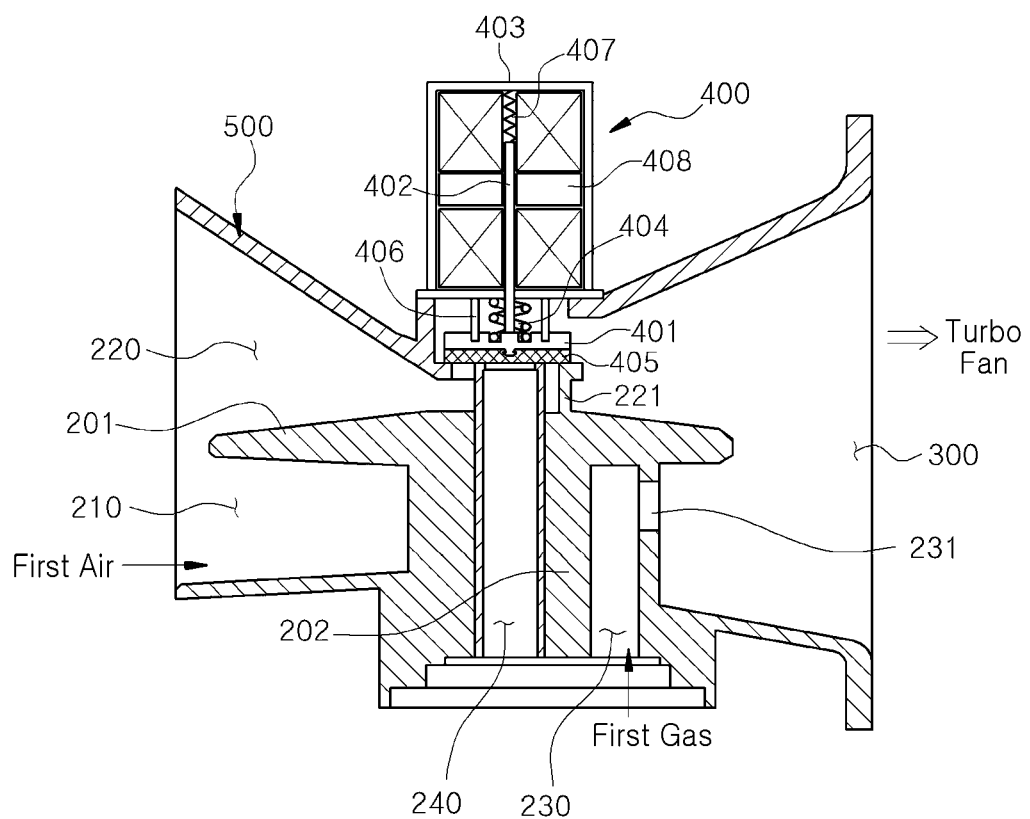
FIG. 2 is a sectional view showing the gas-air mixing device for a combustor according to the present invention.
Figure 3:
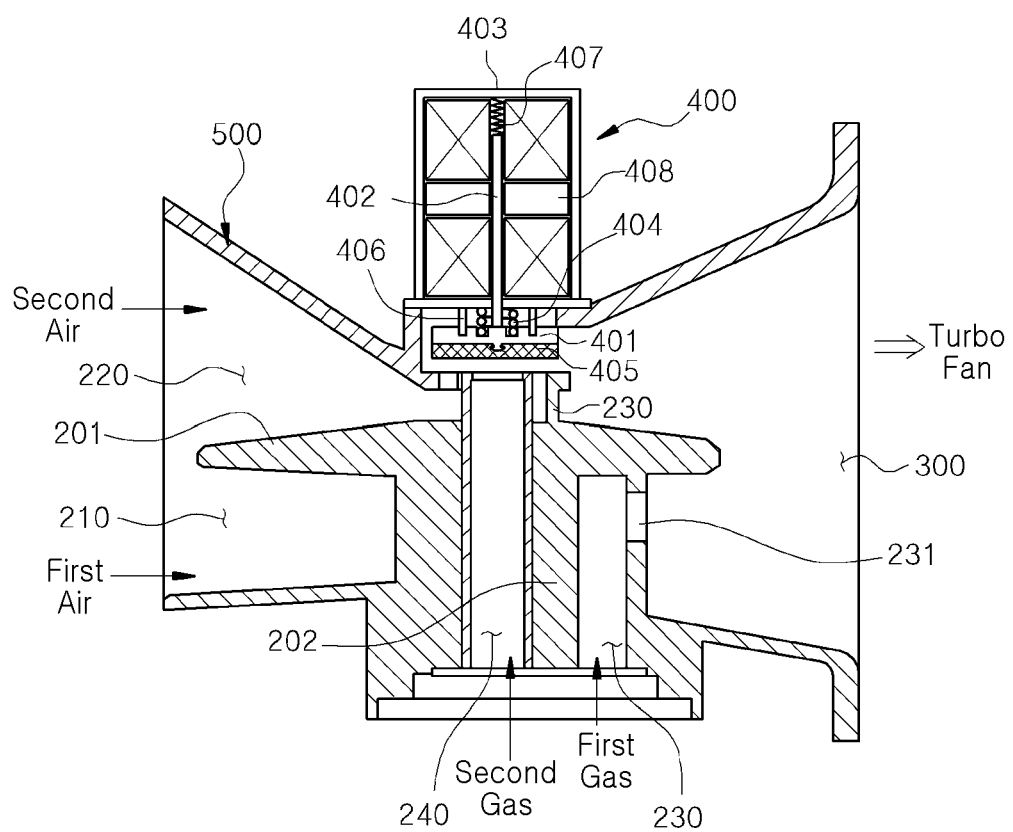
FIG. 3 is a sectional view showing the operating state of FIG. 2.
Figure 4:
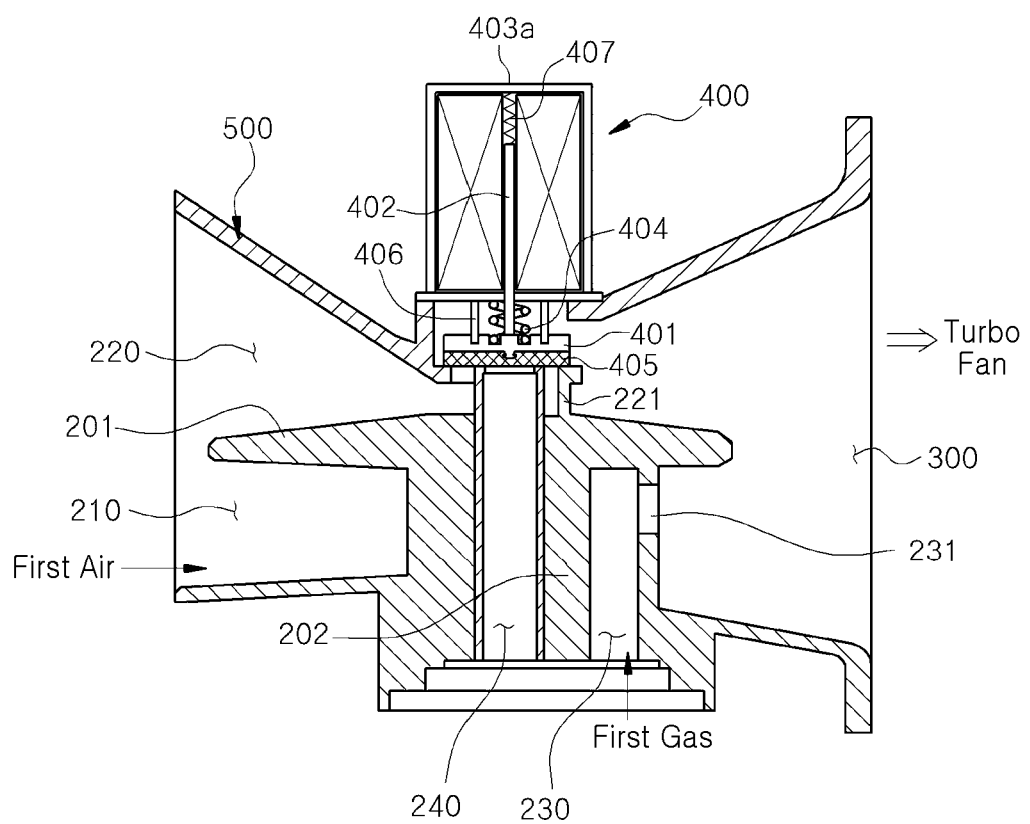
FIG. 4 is a sectional view showing another embodiment of the gas-air mixing device for a combustor according to the present invention.

In the accompanying drawings, FIG. 2 is a sectional view showing the gas-air mixing device for a combustor according to the present invention, FIG. 3 is a sectional view showing the operating state of FIG. 2, and FIG. 4 is sectional view showing another embodiment of the gas-air mixing device for a combustor according to the present invention.

Referring to FIG. 2 and FIG. 4, the gas-air mixing device for a combustor of the present invention comprises a housing (500) that is connected to a turbo fan on one side and is provided with a predetermined space therein through which gas and air can flow. Further, the housing (500) is provided with a discharge part (300) on one side through which mixed gas, that is a mixture of air and gas, is discharged. The discharge part (300) is in contact with the turbo fan (not shown) such that the mixed gas, that is a mixture of air and gas, supplied from the first and second air supply parts (210, 220) and the first and second gas supply parts (230, 240) are transmitted to the burner by the turbo fan.

The other side of the outlet (300) suctions air and is divided by a first partition (201), thereby forming a cylindrically shaped first air supply part (210) at the lower portion and a second air supply part (220) at the upper portion thereof.

The central lower portion between the second air supply part (220) and the discharge part (300) is supplied with gas, and is divided by a second partition (202) such that a first gas supply part (230) is formed on its right side and a second gas supply part (240) is formed on its left side in a cylindrical shape. The second gas supply part (240) has a protruding end that forms a protruding part (221) which is formed in the same direction as the flow direction of a second gas and second air, thereby allowing easy mixing of the air and gas simultaneously with minimization of the stroke of the opening/closing means (400).

The protruding part (221) is in contact with a valve body (401) that is provided in the opening/closing means (400) to be described hereafter, for opening or closing inflow of second gas and second air. It is preferable to protrude the second gas supply part (240) to a height equal to the protruding part (221) for easy connection of the valve body (401).

Hereafter, the opening/closing means (400) for controlling the inflow of air and gas of the second air supply part (220) and the second gas supply part (240) will be described in detail.

The opening/closing means (400) comprises a valve body (401) that is in contact with the upper portion of the protruding part (221) and the second gas supply part (240) to block gas entry, a plunger (402) connected to the valve body (401), and a valve that is connected to the plunger (402) and allows opening and closing of the valve body (401) by causing up and down motion of the plunger (402).

Meanwhile, the valve may be configured as either a latch solenoid valve (403) or a regular solenoid valve (403a).

The latch solenoid valve (403) is provided with a coil therein, thus with instant current flow the plunger (402) operates due to magnetic force, causing the plunger (402) to ascend by overcoming force of a second spring (407). Here, even without continuous current flow to the coil, a permanent magnet (408) holds the plunger (402) in place. At the same time, the valve body (401) ascends to open the second air supply part (220) and the second gas supply part (240), and as a result the second gas and air flow into the housing (500).

Further, when current flows through the coil with opposite polarity, magnetic force counters the force of the permanent magnet and as a result the plunger (402) descends due to the force of the second spring (407). At the same time, the valve body (401) is in contact with the protruding part and the second gas support part (221, 240), which closes the second air supply part (220) and the second gas supply part (240), thus blocking the second air and gas.

Meanwhile, the regular solenoid valve (403a) has an identical configuration as the embodiment above involving the latch solenoid valve (403). Only, in regards to the valve shape, a solenoid valve (403a) is applied instead of the latch solenoid valve (403).

Specifically, as shown in FIG. 4, the plunger (402) ascends by the electrical signal transmitted to the regular solenoid valve (403a) and if the electrical signal is blocked, the plunger (402) descends due to elasticity of a spring (407) provided therein.

Furthermore, the valve body (101) is further provided with an adhesion member (405) at the lower surface thereof, to increase sealing of the contact area with the second gas supply part (220).

In addition, a first spring (404) is interposed between the valve body (401) and the plunger (402) for elastic support of the valve body (401), and a rod (406) is provided on both sides of the plunger (401) to guide the up and down motion of the valve body (401).

Hereafter, operating state of the gas-air mixing device for a combustor of the present invention configured as above will be described in detail.

As illustrated in FIG. 2, the valve body (401) of the opening/closing means (400) comes into contact with the second gas supply part (240) and the protruding part (221) during low input mode, causing only the first gas and air to be mixed only at the first air supply part (210) and the first gas supply part (230) to then flow into the turbo fan. Here, the first gas is discharged through a through-hole (231) formed on the first gas supply part (230).

Subsequently, at high output mode as shown in FIG. 3, the plunger (402) operates when electricity is supplied to the latch solenoid valve (403), thus allowing the plunger (402) to ascend by overcoming force of the second spring (407). As a result, the valve body (401) is ascends upwards to open the second air supply part (220) and the second gas supply part (240), causing the second air and gas to flow into the housing (500).

If the mode is switched back to the low output mode, as shown in FIG. 2, when voltage is applied by switching polarity of the latch solenoid valve (403), magnetic force counters the force of the permanent magnet (408) and the plunger descends due to the force of the second spring (407). Consequently, the valve body (401) descends to the lower region to come into contact with the protruding part (221), which closes the second air supply part (220) and the second gas supply part (240), to block the second air and gas.

The above description relating to a preferred embodiment of a gas-air mixing device for a combustor according to the present invention is merely an example. It will be understood by the skilled person in the art that various modifications and other similar embodiments based on the description provided can be made. Therefore, it is clear that the present invention is not limited to the referred embodiment described above. Accordingly, the scope of the invention to be protected must be based on the technical principles of the accompanying claims. Further, it must be understood that various modifications, additions and substitutions are possible, without departing from the scope and spirit of the invention as disclosed in the accompanying claims.

REFERENCE SIGNS

201: First Partition 202: Second Partition
210: First Air Supply Part 220: Second Air Supply Part
221: Protruding Part 230: First Gas Supply Part
240: Second Gas Supply Part 300: Discharge Part
400: Opening/Closing Means 401: Valve Body
402: Plunger 403: Latch Solenoid Valve
404: First Spring 405: Adhesion Member
406: Rod 407: Second Spring
408: Permanent Magnet

The invention claimed is:

1. An air and gas mixing valve for a water heater, the mixing valve comprising,
a housing connected on one side to a turbo fan and provided with a space of a predetermined size in the interior thereof through which gas and air can flow;
a discharge part disposed on the one side of the housing and in contact with the turbo fan;
a first air supply part and a second air supply part disposed on another side of the housing and separated by a first partition, for suctioning outside air;
a first gas supply part and a second gas supply part separated by a second partition, for supplying gas which mixes with air flowing in from the first air supply part and the second air supply part and discharged via the discharge part, wherein the second gas supply part has an upper end disposed at the same height as an upper end of a protruding part protruding for a predetermined length from an upper portion of the second partition; and
an opening/closing means for blocking flow of gas and air by closing the second air supply part and the second gas supply part in a low-output mode, and for opening the second air supply part and the second gas supply part in high-output mode,
wherein the opening/closing member comprises a valve body for closing the second air supply part and the second gas supply part by being in contact with the upper ends of the second gas supply part and the protruding part when moving downward, and for opening the second air supply part and the second gas supply part when moving upward.

2. The air and gas mixing valve as claimed in claim 1, wherein the opening/closing means further comprises:
a plunger connected to the valve body; and
a valve connected to the plunger and causing opening and closing of the valve body by controlling up and down motions of the plunger.

3. The air and gas mixing valve as claimed in claim 2, wherein the opening/closing means further comprises a first spring that is disposed between the plunger and the valve body and elastically supports the valve body.

4. The air and gas mixing valve as claimed in claim 1, wherein the second air supply part and the second gas supply part are configured to direct the second air and the second gas therein to flow in a same direction.

5. The air and gas mixing valve as claimed in claim 2, wherein the valve is either a latch solenoid valve or a regular solenoid valve.

6. The air and gas mixing valve as claimed in claim 2, wherein the second air supply part and the second gas supply part are configured to direct the second air and the second gas therein to flow in a same direction.

* * * * *